(12) United States Patent
Mart et al.

(10) Patent No.: US 9,091,424 B1
(45) Date of Patent: Jul. 28, 2015

(54) LED LIGHT BULB

(71) Applicants: Gary K. Mart, Bonita Springs, FL (US); Jeffrey Newman, Coral Springs, FL (US)

(72) Inventors: Gary K. Mart, Bonita Springs, FL (US); Jeffrey Newman, Coral Springs, FL (US)

(*) Notice: Subject to any disclaimer, the term of this patent is extended or adjusted under 35 U.S.C. 154(b) by 69 days.

(21) Appl. No.: 13/731,224

(22) Filed: Dec. 31, 2012

Related U.S. Application Data

(63) Continuation of application No. 12/996,221, filed on Dec. 3, 2010.

(51) Int. Cl.
F21V 29/00 (2015.01)
F21V 21/14 (2006.01)

(52) U.S. Cl.
CPC ............... F21V 21/14 (2013.01); F21V 29/00 (2013.01)

(58) Field of Classification Search
CPC ............................................. F21V 29/02
USPC ............... 362/188, 249.1, 367–370, 294, 362/376–378, 427, 249.02
See application file for complete search history.

(56) References Cited

U.S. PATENT DOCUMENTS

| | | | | |
|---|---|---|---|---|
| 4,931,917 A * | 6/1990 | Scherf et al. | ................... | 362/371 |
| 5,367,219 A * | 11/1994 | Friederichs | ................... | 313/113 |
| 5,897,199 A * | 4/1999 | Norris | ........................... | 362/191 |
| 7,686,483 B1 * | 3/2010 | Aubrey | ........................ | 362/371 |
| 2005/0174780 A1 * | 8/2005 | Park | ............................ | 362/294 |
| 2009/0213595 A1 * | 8/2009 | Alexander et al. | ............ | 362/373 |
| 2009/0237934 A1 * | 9/2009 | Zeng et al. | ............... | 362/249.03 |
| 2010/0124058 A1 * | 5/2010 | Miller | ...................... | 362/249.02 |
| 2010/0315824 A1 * | 12/2010 | Chen | ............................. | 362/373 |

* cited by examiner

Primary Examiner — Evan Dzierzynski
(74) Attorney, Agent, or Firm — Patents on Demand, P.A.; Brian K. Buchheit; Scott M. Garrett

(57) ABSTRACT

A retrofit light emitting diode (LED) bulb includes a screw connector, a bracket, and a housing. The screw connector is configured to be screwed into a receiving socket of an electric light fixture for supporting the retrofit light emitting diode (LED) bulb. The bracket is physically attached to the screw connector. The housing is rotatably coupled to the bracket. The housing includes one or more LED units for generating light and one or more electrically powered cooling devices to remove heat from the vicinity of the one or more LED units.

20 Claims, 17 Drawing Sheets

LED LIGHT BULB

CROSS-REFERENCE TO RELATED APPLICATION

This application claims the benefit of U.S. patent application Ser. No. 12/996,221 entitled "LED LIGHT BULB", filed Dec. 2, 2010, which is herein incorporated by reference in their entirety.

BACKGROUND

The present invention relates to the field of lighting and, more particularly, to using individual cluster-level power regulation circuits to extend light-emitting diode (LED) light life.

Light emitting diode-based (LED-based or simply LED) light bulbs are becoming increasingly popular for many reasons. LED light bulbs have a longer lifespan and lesser environmental impact when compared to typical compact fluorescent bulbs. Further still, LED light bulbs are subject to much less of a spectrum shift over the lifetime of the bulb. Many present approaches for LED light bulbs are directed at creating light bulbs which require non-standard connectors.

DETAILED DESCRIPTION

Figure 1:
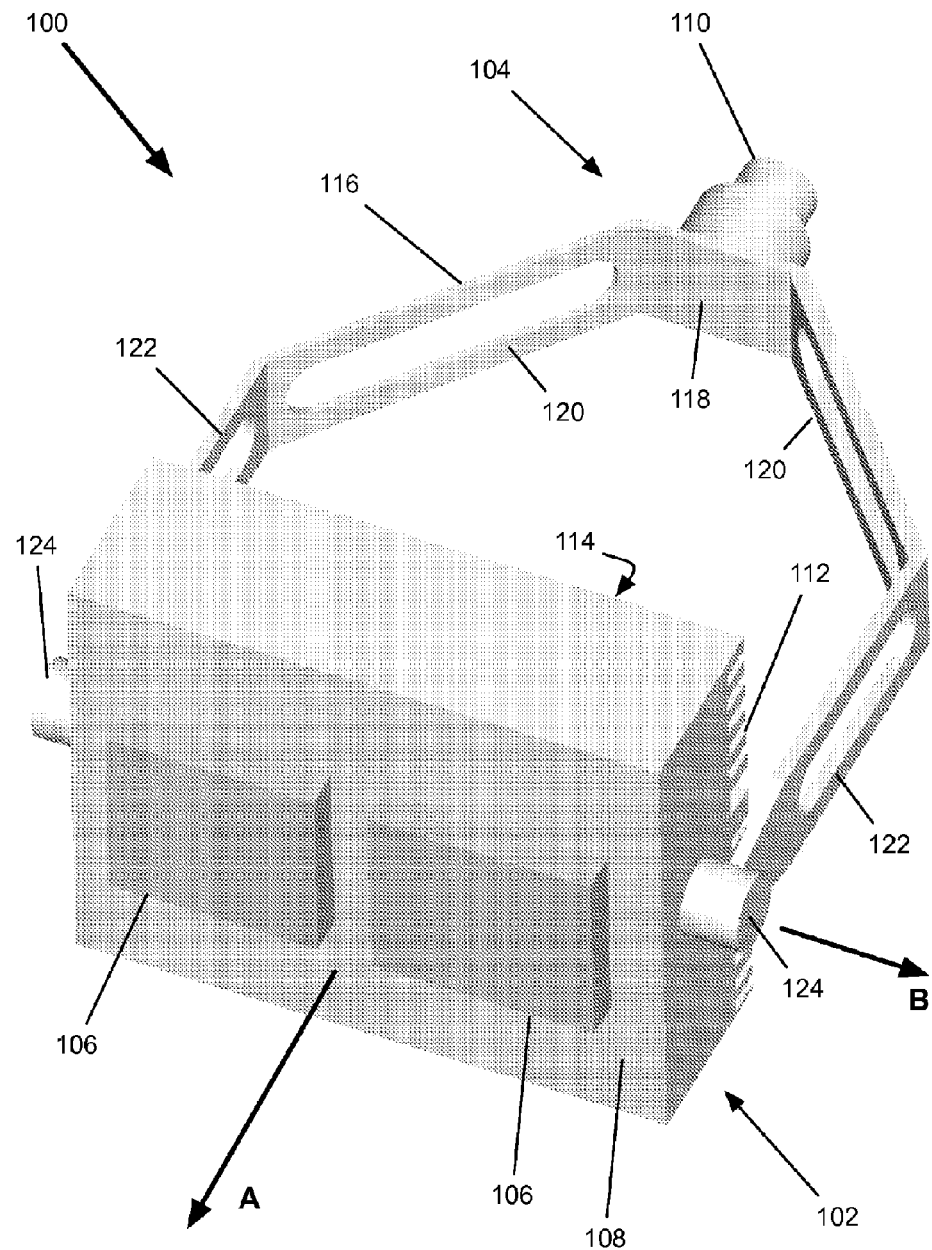
FIG. 1 is a front-side perspective view of an LED bulb according to an embodiment.

FIG. 1 depicts a front-side view of an LED bulb 100 according to an embodiment of the present invention. Bulb 100 comprises a housing 102 operatively coupled with a bracket 104. Housing 102 is box or parallelipiped-shaped and bracket 104 is U-shaped. In at least some alternative embodiments, housing 102 and bracket 104 may comprise different shapes and/or sizes. Housing 102 is formed of a plastic or other lightweight material. In at least some embodiments, housing 102 may comprise a metal, e.g., aluminum, steel, etc. Bracket 104 is formed of plastic; however, other materials may be used, e.g., metal. In differing embodiments, bulb 100 may comprise different sizes, shapes, and/or profiles, e.g., a BR40, BR30, BR20, PAR16, PAR20, PAR30, PAR38 and/or other configurations.

In at least some embodiments, an LED bulb 100 according to one or more embodiments of the present invention are used in a retrofit manner to replace an existing light bulb in an existing light fixture. As described below, LED bulb 100, in at least some embodiments, comprises a bracket, housing, LED units, and a base arranged to enable the illumination-generating portion to be oriented within an existing light fixture (as a replacement for an existing light bulb or other illumination-generating device) to cause the generation of a desired illumination intensity and/or light pattern. LED bulb 100 may be oriented by, for example, sliding, centering, or rotating housing 102 within bracket 104 and/or performing a similar operation or positioning of the housing separate from the bracket and/or base connector.

In at least some embodiments, LED bulb 100 may be referred to as a retrofit LED bulb as the LED bulb is used to replace existing bulbs in existing fixtures. In some embodiments, the retrofit LED bulbs take advantage of features of the existing light fixture, e.g., light fixture heat sink design and/or capability. The retrofit LED bulb provides the capability to replace an existing bulb with a positionable light-generating device able to be oriented to provide different light patterns as needed by a particular installation, e.g., of a light fixture.

Housing 102 comprises two LED units 106 disposed on a front face 108 of the housing and arranged to generate light in a direction (generally indicated by reference A) away from the front face of the housing. Bracket 104 comprises a power connector 110 for connecting bulb 100 to a power connection, e.g., a receiving socket such as a light socket or other connection mechanism, and powering, via internal connections, LED units 106. In use, power connector 110 of bulb 100 is screwed into a receiving socket to provide power to the LED units 106 and thereby generate light.

Although housing 102 is depicted as comprising two LED units 106, in alternative embodiments housing 102 comprises variously at least one or more than two LED units. In alternative embodiments, LED units 106 may be different sizes and/or shapes.

Housing 102 also comprises a set of vanes 112 arranged about a rear face 114 of the housing for dissipating heat generated by bulb 100. Each vane 112 extends longitudinally along housing 102. In at least some embodiments, housing 102 does not comprise vanes 112. In at least some embodiments, vanes 112 may reside between housing 102 and bracket 104. In some embodiments, vanes 112 may comprise a separate component from housing 102.

Bracket 104 comprises a U-shaped arm 116 arranged to cooperatively couple power connector 110 to housing 102. Arm 116 forms a U-shape connecting to housing 102 at the opposing distal ends of the arm and connecting to power connector 110 at the base of the U shape arm. In alternate embodiments, arm 116 may comprise separate arms, e.g., two, joined together at the power connector 110 connection point.

Arm 116 comprises a flat land portion 118 to which power connector 110 connects, a pair of lengths 120 extending away from land portion 118 at an angle, and a pair of second lengths 122 extending away from angled lengths 120 and providing a connecting point for housing 102. In at least some embodiments, arm 116 is formed of a single piece of material. In at least some embodiments, arm 116 comprises a single rounded piece of material forming the U shape instead of several angularly connected lengths. Arm 116 comprises one or more openings in the lengths.

Arm 116 connects to housing 102 via connecting points 124. Connecting points 124 each connect to an opposing face of housing 102 from the other. In at least some embodiments, connecting points 124 are movably connected to housing 102. In at least some embodiments, connecting points 124 provide a rotatable connection between housing 102 and bracket 104. In at least some embodiments, housing 102 is able to rotate about an axis B which passes through connecting points 124.

In at least some embodiments, connecting points 124 are configured to slide along second lengths 122 in a direction A to/from land portion 118. In this manner, housing 102 may be positioned closer to or farther away from connector 110.

Power connector 110 is electrically coupled with LED units 106 to provide power to the units for light generation. In at least some embodiments, the coupling between power connector 110 and LED units 106 is provided by a wire connection along one or both sides of arm 116. In at least some embodiments, one or both of connecting points 124 provide a rotatable electrical connection to LED units 106 via housing 102.

Power connector 110 may comprise at least one of a plurality of different connectors, e.g., a GU24, GU10, E11, E12, E17, E26, MR16, MR11, etc. In at least some embodiments, different mechanisms may be used to connect power connector 110 to arm 106. In at least one embodiment, power connector 110 is formed as an integral part of arm 106. In at least one embodiment, power connector 110 comprises wire leads for connecting bulb 100 to a power source, e.g. a driver circuit or a mains power source. In at least some embodiments, a driver circuit or a ballast may be attached to bracket 104. In at least some embodiments, the driver circuit or ballast may be replaceable. In at least some embodiments, the driver circuit or ballast may be formed as an integral part of bracket 104.

Bracket 104 is coupled in a removable manner with housing 102. Bracket 104 is operatively coupled with housing 102 by one or more removable attaching devices, e.g., screws, bolts, etc, at connecting points 124. In at least some embodiments, different releasable mounting mechanisms may be used to connect bracket 104 with housing 102.

Figure 2:
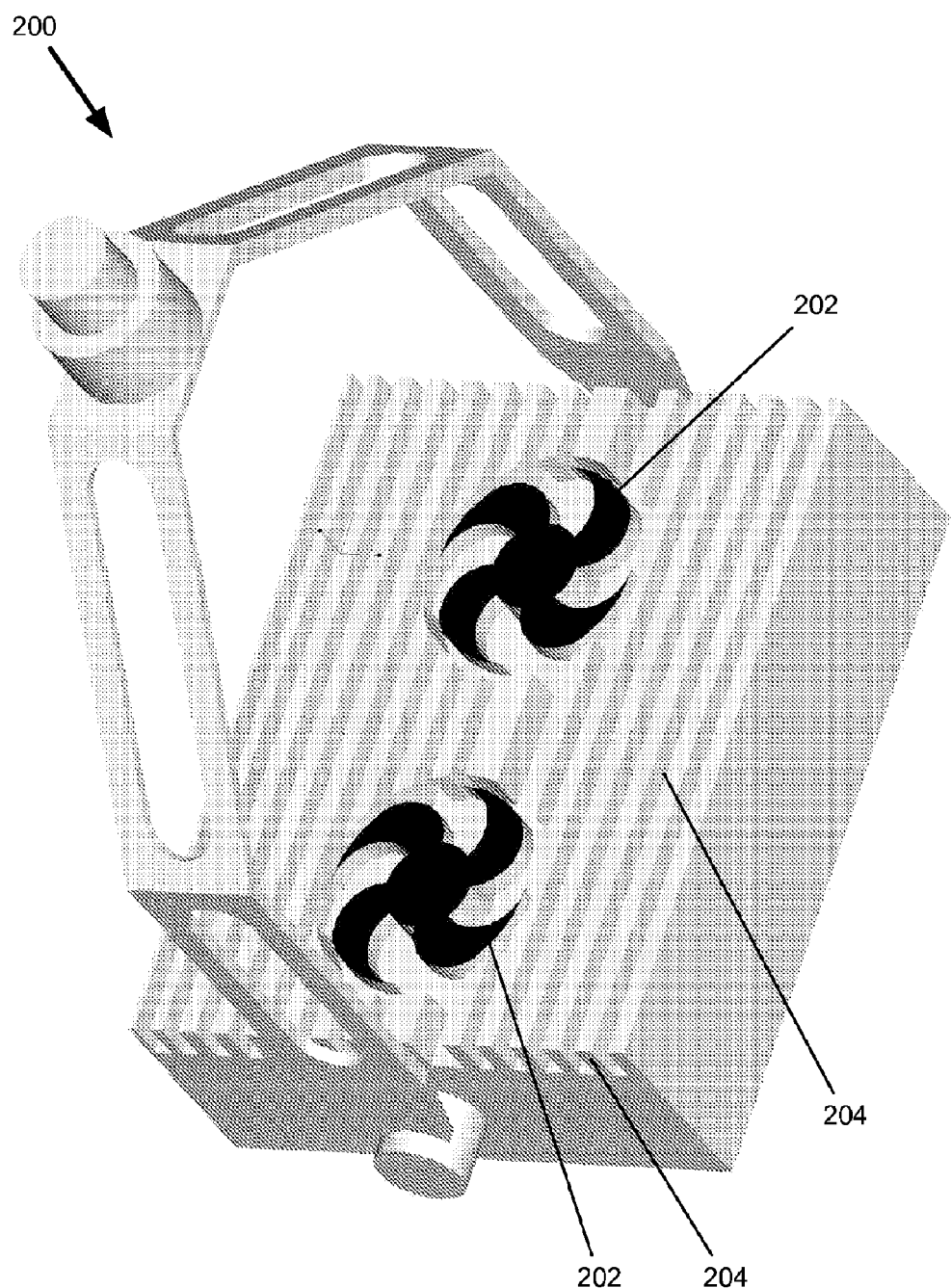
FIG. 2 is a rear-side perspective view of an LED bulb according to an embodiment.

FIG. 2 depicts a rear-side perspective view of an embodiment of an LED bulb 200 similarly arranged as LED bulb 100 except as noted herein. In at least some embodiments as depicted in FIG. 2, bulb 200 comprises a pair of cooling fans 202 arranged on a rear face 204 of housing 102. In at least some embodiments, cooling fans 202 are attached to rear face 204 directly. In at least some embodiments, cooling fans 202 are attached to rear face 204 atop vanes 206 arranged on the rear face. In at least some embodiments, cooling fans 202 are configured to cause airflow to proceed in a direction away from housing 102, whereas in other embodiments, cooling fans 202 force airflow through housing 102 toward front face 108.

Figure 3:
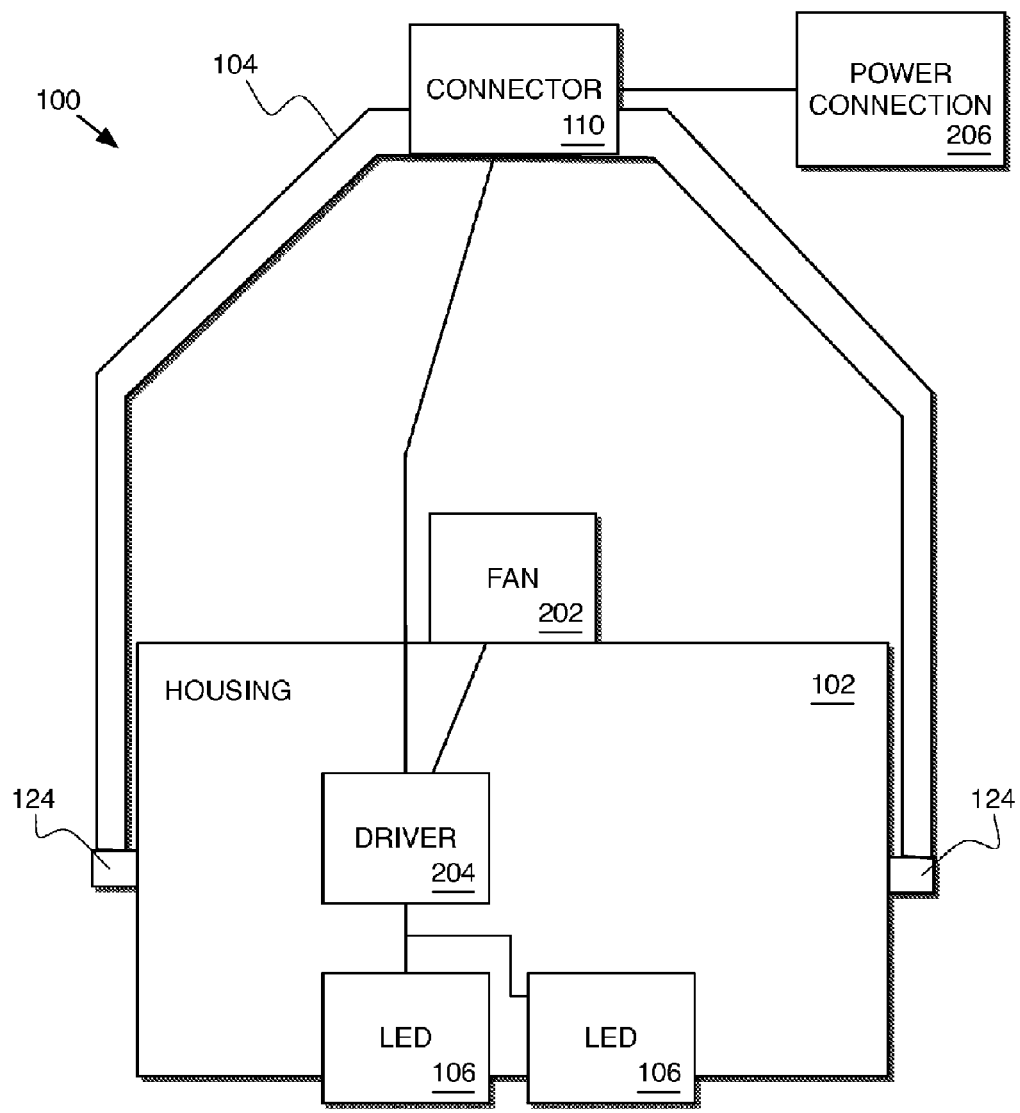
FIG. 3 is a high-level functional block diagram of an LED bulb according to an embodiment.

FIG. 3 depicts a high-level functional block diagram of bulb 100 comprising housing 102 and bracket 104. Housing 102 comprises LED units 106, e.g., LED circuit, etc., a driver circuit 204 for controlling power provided to LED units 106, and fan 202. LED units 106 and fan 202 are operatively and electrically coupled to driver 204 which is, in turn, electrically coupled to connector 110 and power connection 206. In at least some embodiments and as depicted in other Figures, driver circuit 204 is not a part of housing 102 and is instead connected between power connection 206 and connector 110.

In at least some embodiments, LED units 106 and fan 202 are electrically coupled to a single connection to driver 204. For example, in at least some embodiments, the electrical connection between driver 204 and LED units 106 and fan 202 comprises a single plug connection. The single plug connection may be plugged and unplugged by a user without requiring the use of tools.

In at least some embodiments, housing 102 may comprise a greater number of LED units 106. In at least some embodiments, housing 102 may comprise a greater number of fans 202.

LED units 106 generates light responsive to receipt of current from driver 204.

Fan 202 rotates responsive to receipt of current from driver 204. Rotation of fan 202 causes air to be drawn in through vents in front face 108 and expelled via vents in rear face 114. The flow of air through bulb 100 by rotation of fan 202 removes heat from the vicinity of LED units 106 thereby reducing the temperature of the LED unit. Maintaining LED unit 106 below a predetermined temperature threshold maintains the functionality of LED unit 106. In at least some embodiments, LED unit 106 is negatively affected by operation at a temperature exceeding the predetermined temperature threshold. In at least some embodiments, the number of vents is dependent on the amount of air flow needed through the interior of LED bulb 100 to maintain the temperature below the predetermined threshold. In at least some embodiments, fan 202 may be replaced by one or more cooling devices arranged to keep the temperature below the predetermined temperature threshold. For example, in some embodiments, fan 202 may be replaced by a movable membrane or a diaphragm or other similar powered cooling device.

In at least some embodiments, fan 202 is integrally formed as a part housing 102. In at least some other embodiments, fan 202 is directly connected to housing 102. In still further embodiments, fan 202 is physically connected and positioned exclusively within housing 102.

In at least some embodiments, fan 202 may be operated at one or more rotational speeds. In at least some embodiments, fan 202 may be operated in a manner in order to draw air into bulb 100 via the vents on rear face 114 and expel air through vents on front face 108. By using fan 202 in LED bulb 100, thermal insulating material and/or thermal transfer material need not be used to remove heat from the LED bulb interior.

In at least some embodiments, fan 202 operates to draw air away from housing 102 and toward a heat sink adjacent LED bulb 100. For example, given LED bulb 100 installed in a light fixture (see e.g., FIG. 14), fan 202 pulls air away from housing 102 and LED units 106 and pushes air toward the light fixture, specifically, air is moved from LED bulb 100 toward the light fixture.

In at least some embodiments, existing light fixtures for using high output bulbs, e.g., high-intensity discharge (HID), metal halide, and other bulbs, are designed such that the light fixture operates as a heatsink to remove the heat generated by the HID bulb from the portion of the fixture surrounding the bulb and the bulb itself. In a retrofit scenario in which LED bulb 100 replaces an existing light bulb, e.g. a HID bulb, in a light fixture designed for the existing light bulb, fan 202 of LED bulb 100 operates to move air from the LED bulb toward the existing heat sink of the light fixture. Because LED bulb 100 typically generates less heat than the existing bulb, the operation of fan 202 in connection with the LED bulb increases the life of the LED bulb within the light fixture. LED bulb 100 including fan 202 takes advantage of the design of the existing light fixture heatsink functionality.

Driver 204 comprises one or more electronic components to convert alternating current (AC) received from connector 110 connected to a power connection 206, e.g., a mains power supply or receiving socket, to direct current (DC). Driver 204 transmits the converted current to LED units 106 and fan 202 in order to control operation of the LED unit and fan. In at least some embodiments, driver 204 is configured to provide additional functionality to bulb 100. For example, in at least some embodiments, driver 204 enables dimming of the light produced by bulb 100, e.g., in response to receipt of a different current and/or voltage from power connector 110.

In at least some embodiments, driver 204 is integrated as a part of housing 102. In at least some embodiments, driver 204 is configured to receiver a range of input voltage levels for driving components of housing 102, i.e., LED units 106 and fan 202. In at least some embodiments, driver 204 is configured to receive a single input voltage level.

Bracket 104 also comprises connection point 124 for removably and rotatably attaching the bracket and housing 102. In at least some embodiments, connection point 124 is a screw. In at least some further embodiments, connection point 124 is a bolt, a reverse threading portion for receipt into housing 102, a portion of a twist-lock or bayonet mechanism.

In operation, if one or more LED units 106 in a particular housing 102 degrades or fails to perform, the entire LED bulb 100 need not be replaced. In such a situation, only housing 102 needs replacing. Similarly, if driver 204 fails or degrades in performance, only housing 102 needs to be replaced. If, in accordance with alternate embodiments, driver circuit 204 is connected external of bulb 100, driver circuit 204 may be replaced separate from bulb 100. Because of the use of releasably coupled components, i.e., bracket 104 and housing 102, the replacement of one or the other of the components may be performed on location with minimal or no tools required by a user. That is, the user may remove LED bulb 100 from a socket, replace housing 102 with a new housing, and replace the LED bulb into the socket in one operation. Removal of LED bulb 100 to another location or transport of the LED bulb to a geographically remote destination for service is not needed. Alternatively, the user may remove driver circuit 204 from between power connection 206 and connector 110, in applicable embodiments, and replace the driver.

Also, if the user desires to replace a particular driver 204 of a bulb 100, the user need only remove and replace the currently connected driver 204. For example, a user may desire to replace a non-dimmable driver with a driver which supports dimming. Also, a user may desire to replace a driver having a shorter lifespan with a driver having a longer lifespan. Alternatively, a user may desire to replace a housing having a particular array of LED units 106 with a different selection of LED units 106, e.g., different colors, intensity, luminance, lifespan, etc.; the user need only detach housing 102 from bracket 104 and reattach the new housing 102 to the bracket.

Figure 4:
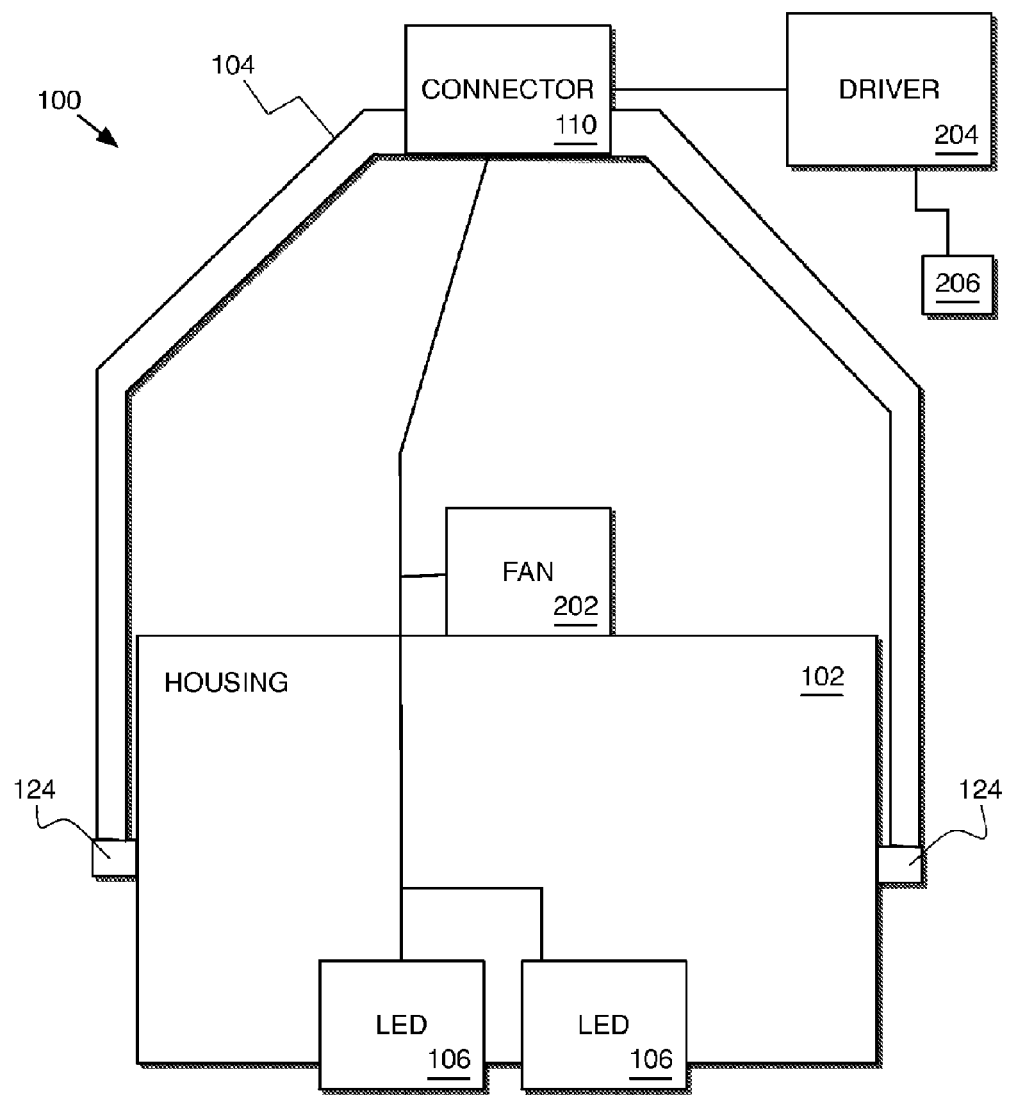
FIG. 4 is a high-level functional block diagram of an LED bulb according to another embodiment.

FIG. 4 depicts another embodiment of LED bulb 100 as described above, wherein driver circuit 204 is removed from housing 102 and connects between connector 110 and power source 206.

Figure 5:
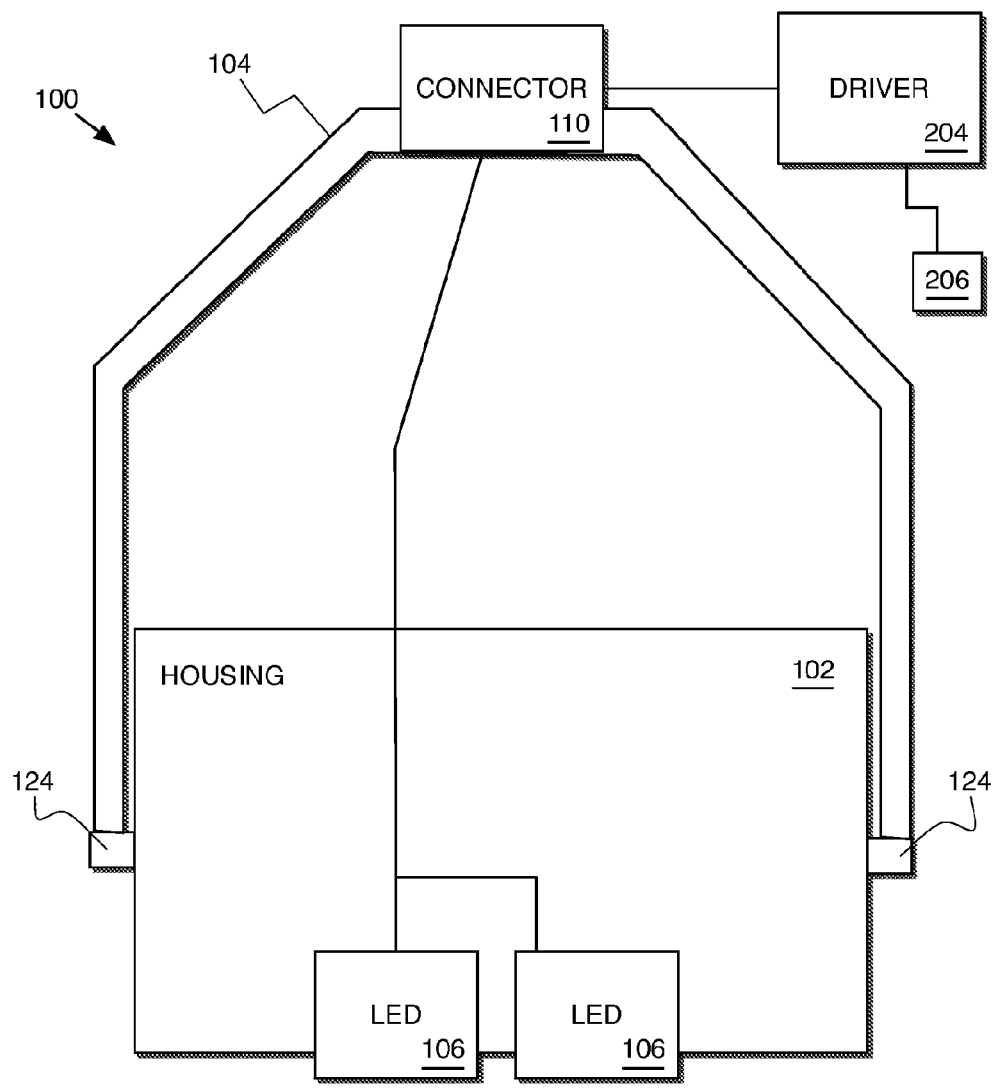
FIG. 5 is a high-level functional block diagram of an LED bulb according to another embodiment.

FIG. 5 depicts another embodiment of LED bulb 100 as described above, wherein driver circuit 204 is removed from housing 102 as in FIG. 4 and a fan is not needed to cool LED units 106.

Figure 6:
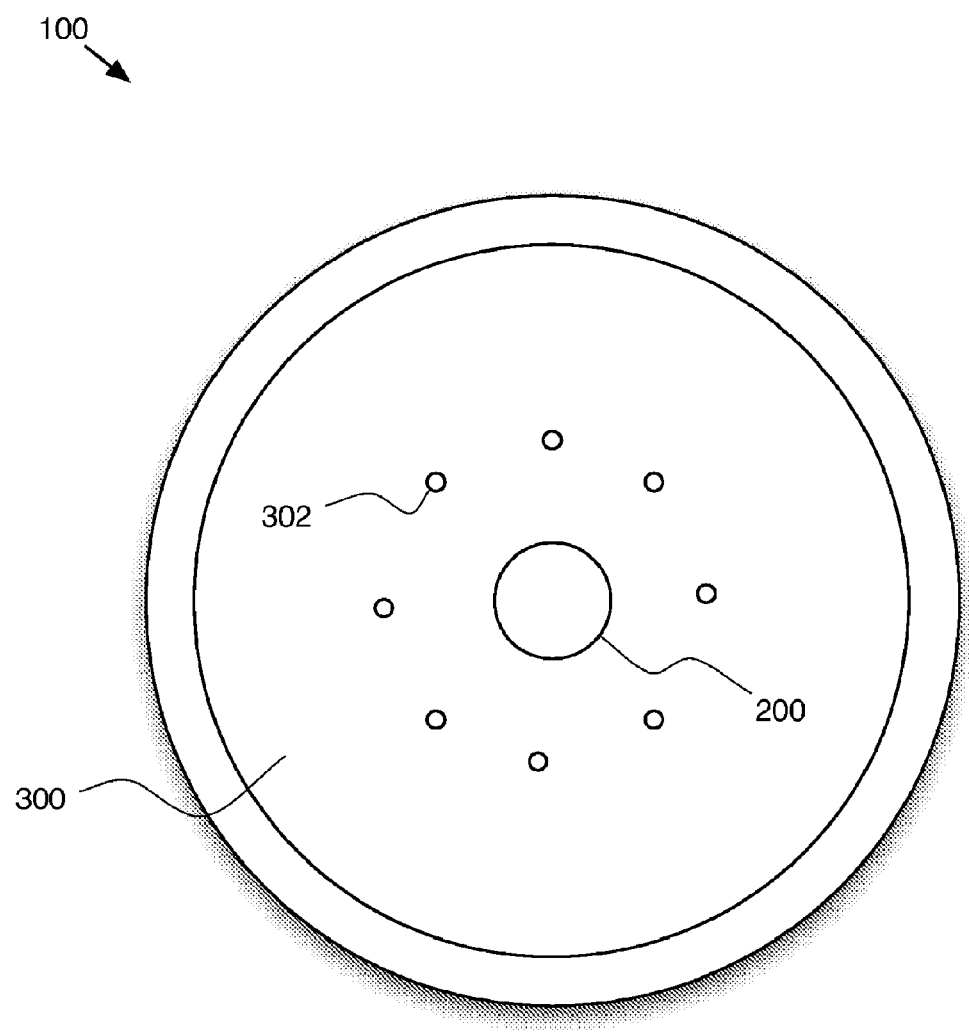
FIG. 6 is a front plan view of the front face of an LED bulb according to an embodiment.

FIG. 6 depicts a front plan view of a front face 300 of an LED bulb 100 comprising a plurality of front vents 302 according to another embodiment. Front vents 302 are radially disposed around LED unit 200, similar to LED unit 106. In one or more alternative embodiments, front vents 302 may be larger or smaller and there may be a greater or lesser number of front vents. In at least some embodiments, the number of front vents 302 is dependent on the amount of air flow needed through the interior of LED bulb 100 to maintain the temperature below the predetermined threshold.

In at least some embodiments, front vents 302 may be circular, oval, rectangular, or polygonal or another shape. Front vents 302 may also be slits or other shaped openings to the interior of housing 102. In at least some embodiments, front vents 302 may be formed as a part of the opening in front face 300 for LED unit 200.

Figure 7:
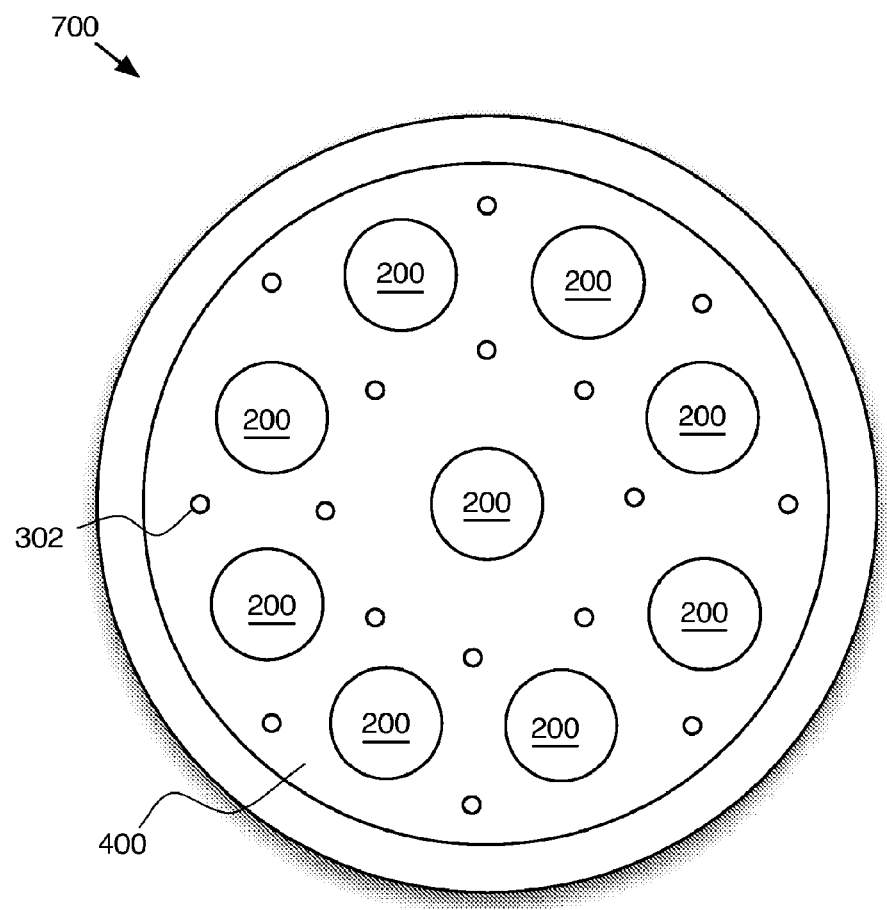
FIG. 7 is a front plan view of the front face of an LED bulb according to another embodiment.

FIG. 7 depicts a front plan view of front face 400 of LED bulb 700 according to another embodiment wherein the bulb comprises more than one LED unit 200. LED bulb 700 also comprises a plurality of front vents 302. Because of the greater number of LED units 200, there may be a greater number of front vents 302 or the front vents may be larger in size.

In at least some embodiments, LED units 200 may comprise different size, shape, and light-emitting characteristics.

Figure 8:
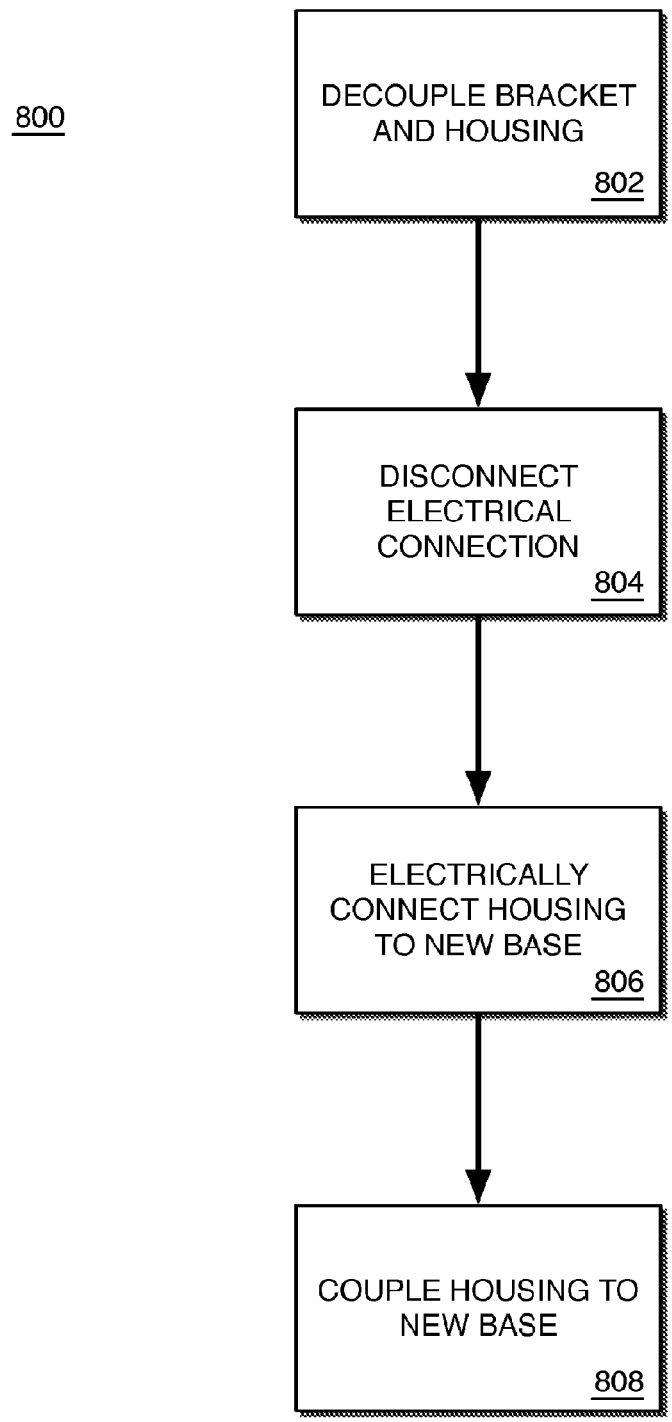
FIG. 8 is a high-level process flow diagram of a method according to an embodiment.

FIG. 8 depicts a high-level process flow of a method 800 for replacing a housing 102 of an LED bulb 100. The flow begins at a decoupling step 902 wherein a user disconnects housing 102 from bracket 104. Next during electrical disconnect step 904, the user disconnects the electrical connection between bracket 104 and housing 102. In at least one embodiment, the user unplugs a single plug electrical connection connecting bracket 104 and housing 102. In at least one embodiment, the user does not remove any thermal insulating and/or transfer material from LED bulb 100.

The flow proceeds to electrical connect step 906 wherein the user electrically connects a new housing 102 to bracket 104. For example, the user plugs the single plug electrical connection from housing 102 to bracket 104.

The flow proceeds to coupling step 908 wherein the user connects housing 102 to the new base 104.

Figure 9:
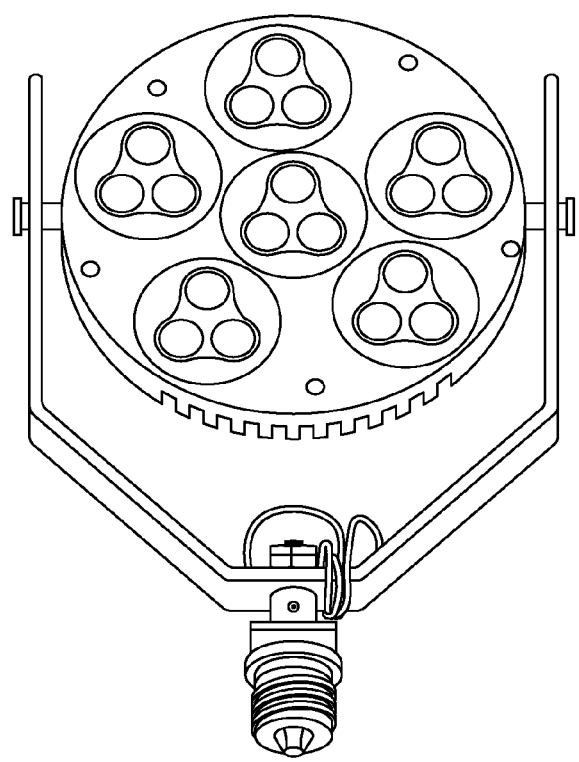
FIG. 9 is an illustration of an LED bulb according to an embodiment.

FIG. 9 is an illustration of an embodiment of bulb 100 in a flat state. Also, bulb 100 as illustrated comprises connection point 124 affixed to housing 102. Connection point 124 passes through openings in arm 116 of bracket 104 to enable housing 102 to be positioned along the length of the arm, in addition to enabling the rotation of the housing. Further, FIG. 9 depicts bulb 100 with power connection 206 attached to connector 110.

Figure 10:
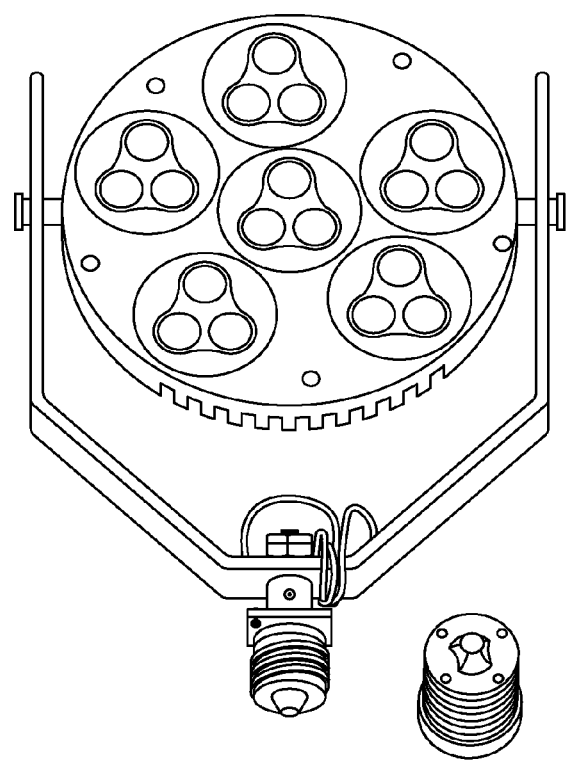
FIG. 10 is an illustration of an LED bulb according to the FIG. 9 embodiment without a power connection attached.

FIG. 10 is an illustration of the FIG. 9 embodiment with power connection 206 removed from connector 110. In both FIGS. 9 and 10, wire leads from connector 110 to housing 102 are disconnected.

Figure 11:
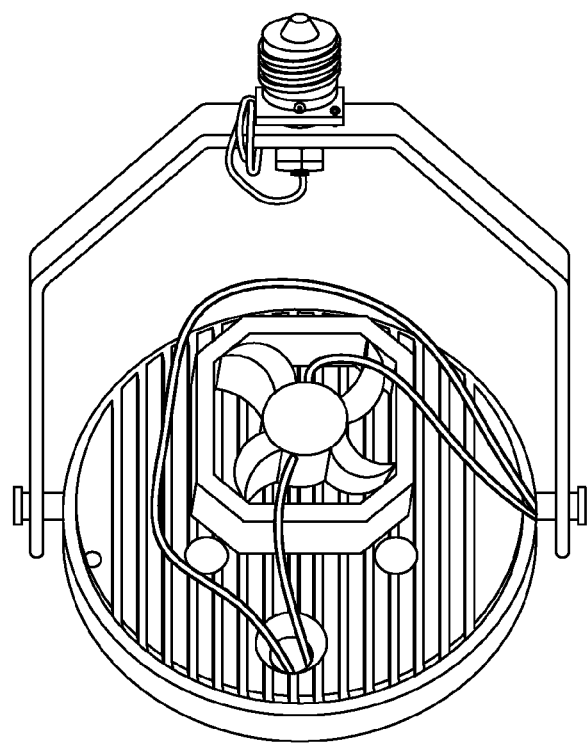
FIG. 11 is an illustration of an LED bulb according to the FIG. 9 embodiment in a non-flat state.

FIG. 11 is an illustration of the FIG. 9 embodiment with housing 102 at an angular displacement around connection points 124 such that the housing is positioned at approximately a ninety degree angle with respect to arm 116.

Further, as depicted in FIGS. 9-11, housing 102 may be slidably attached to bracket 104 by connection point 124. FIGS. 9 and 10 illustrate housing 102 slid partially along the openings in arm 116 of bracket 104 toward connector 110. FIG. 11 illustrates housing 102 slid to the distal end of the openings in arm 116 of bracket 104 away from connector 110.

Figure 12:
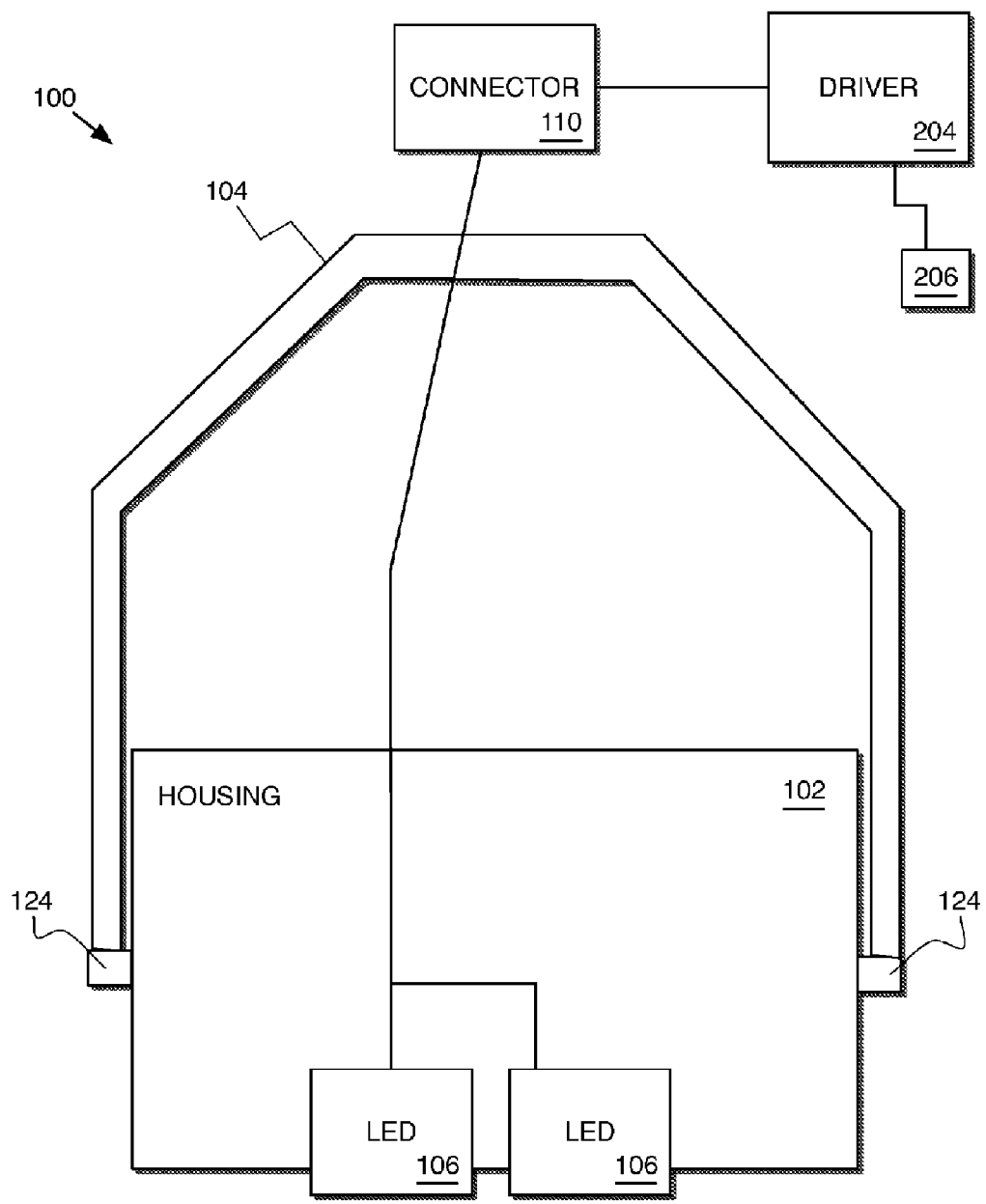
FIG. 12 is a high-level functional block diagram of an LED bulb according to another embodiment lacking a direct physical connection between a bracket and a connector of the LED bulb.

FIG. 12 depicts another embodiment of LED bulb 100 as described above, wherein driver circuit 204 is removed from housing 102 as in FIG. 4 and a fan is not needed to cool LED units 106 as in FIG. 5 and wherein bracket 104 is not directly connected with connector 110. In accordance with at least some embodiments, such a configuration enables the housing 102, comprising LEDs 106, along with bracket 104 to be mounted to one portion of a fixture while the supply of electricity for driving bulb 100 is received from connector 110, driver 204, and power connection 206 at another location and/or position. In at least some embodiments, driver 204 is excluded from bulb 100, e.g., LEDs 106 may be configured to operate on alternating current, and connector 110 connects directly to power connection 206.

Figure 13:
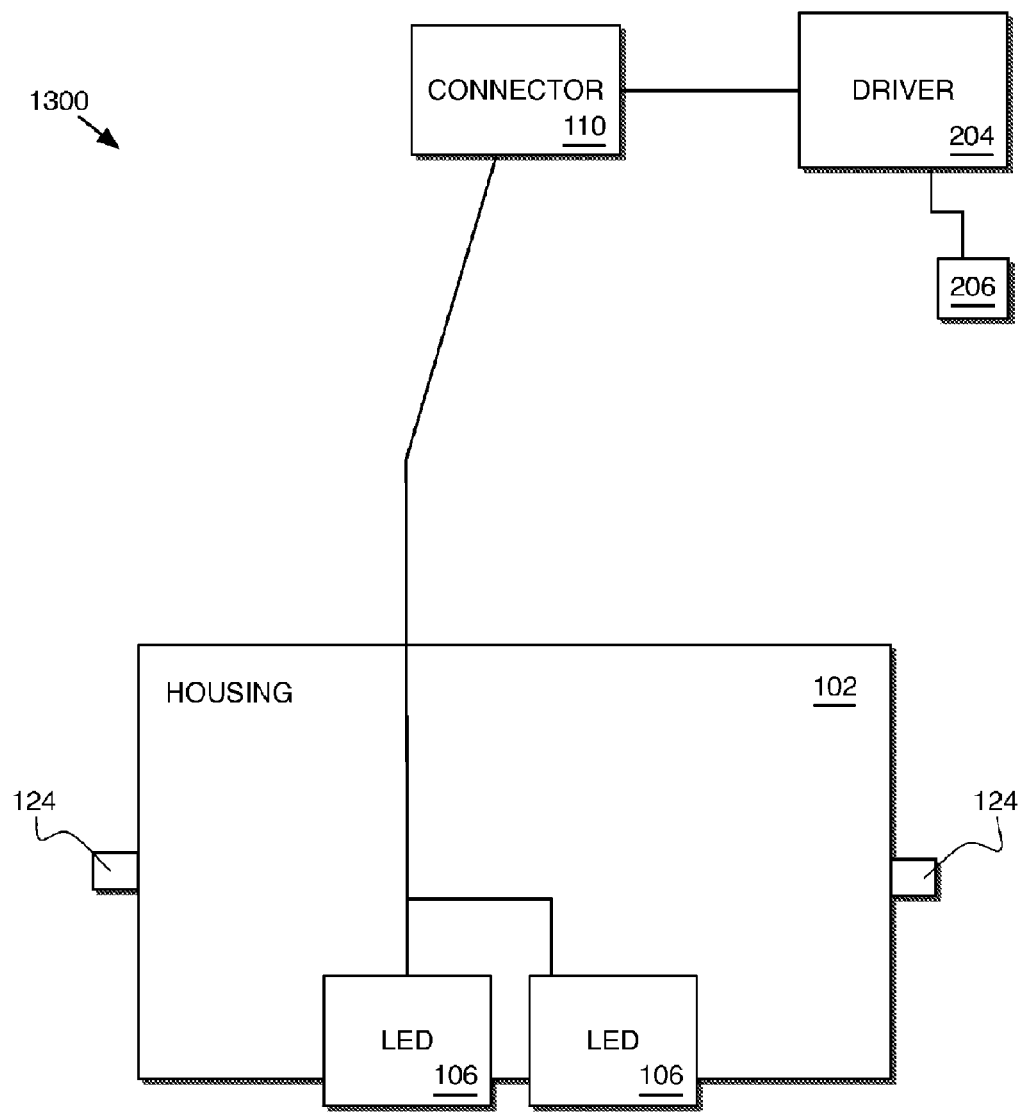
FIG. 13 is a high-level functional block diagram of an LED bulb according to another embodiment lacking a bracket.

FIG. 13 depicts an embodiment of LED bulb 1300 as described above, wherein driver circuit 204 is removed from housing 102 as in FIG. 4 and a fan is not needed to cool LED units 106 as in FIG. 5 and wherein bracket 104 has been removed from bulb 1300. In accordance with at least some embodiments, such a configuration enables housing 102 to be mounted at one location and/or position and only separately electrically connected with connector 110 to receive electrical power. In at least some embodiments, housing 102 may be physically connected with a light fixture or positioned in attachment to an area to be illuminated via one or more attaching mechanisms, e.g. a bolt, a screw, etc. In at least some other embodiments, housing 102 may be physically connected with a light fixture or positioned via a connection with one or both of connecting points 124.

Figure 14:
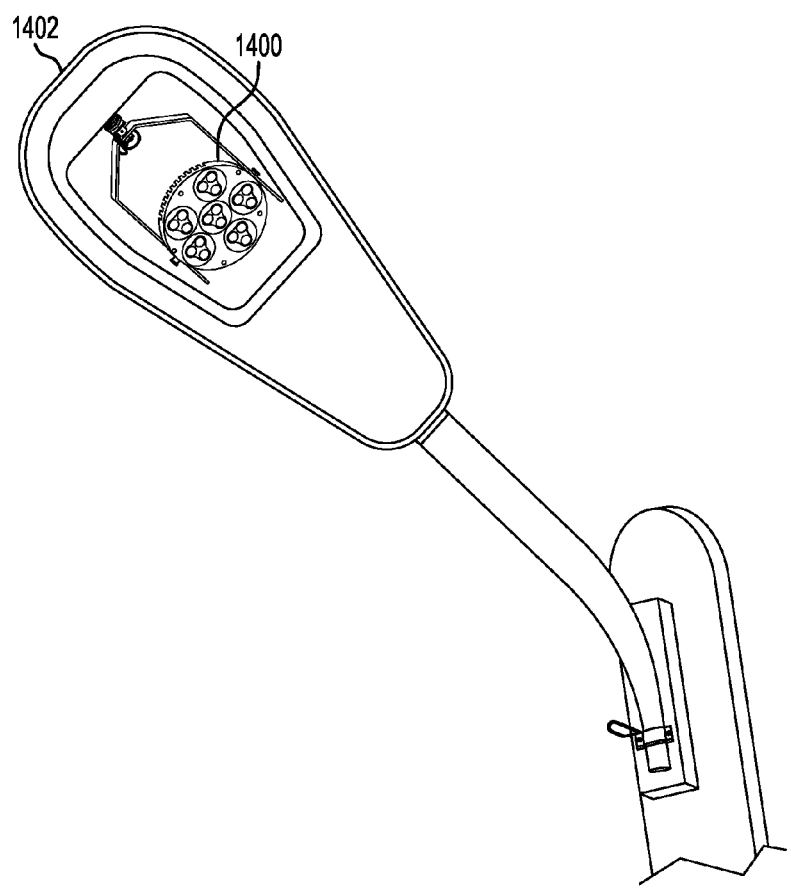
FIG. 14 is an image of an exemplary embodiment of an LED bulb according to FIG. 13 installed in a fixture.

FIG. 14 depicts an image of an LED bulb 1400 similar to the FIG. 13 embodiment installed in a light fixture 1402.

Figure 15:
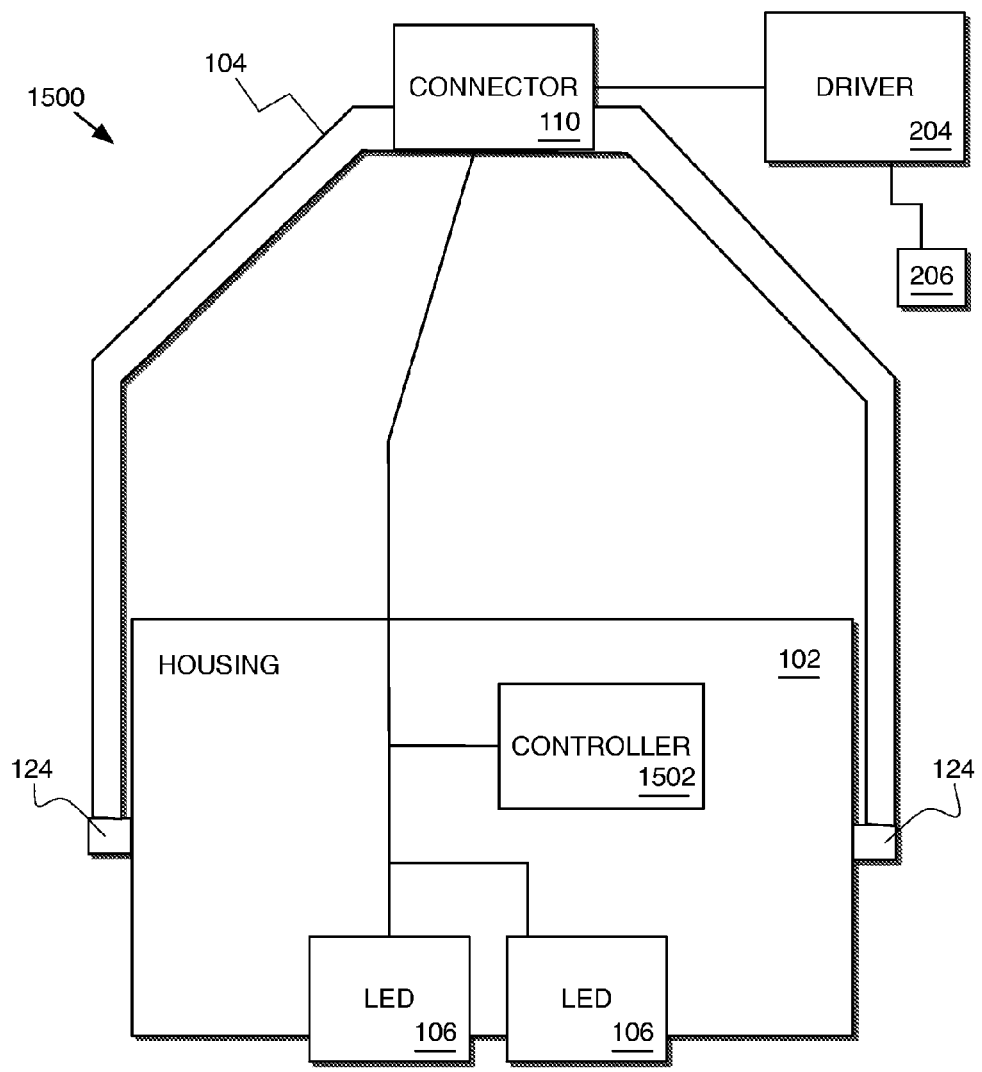
FIG. 15 is a high-level functional block diagram of an LED bulb according to another embodiment comprising a controller.

FIG. 15 depicts an LED bulb 1500 according to an embodiment similar to LED bulb 100 as described above. Specifically, LED bulb 1500 differs from LED bulb 100 of FIG. 5 in that the bulb further comprises a controller 1502 configured to control operation of LED bulb 1500. In at least some embodiments, LED bulb 1500 may be configured with respect to one or more embodiments as depicted and described above.

Figure 16:
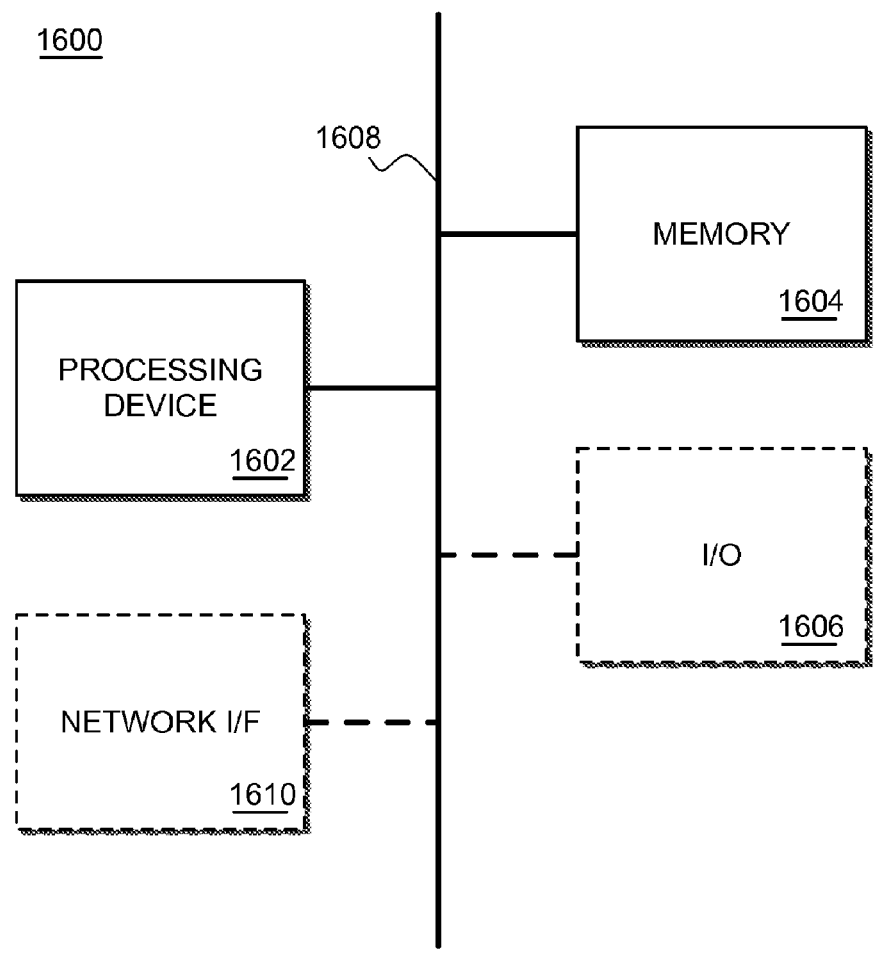
FIG. 16 is a high-level functional block diagram of a controller according to an embodiment.

FIG. 16 depicts a high-level functional block diagram of a controller embodiment 1600 of controller 1502 as a processing device for executing a set of instructions. Controller embodiment 1600 comprises a processing device 1602, a memory 1604, and an (optional) input/output (I/O) device 1606 each communicatively coupled with a bus 1608. Controller embodiment 1600 optionally comprises a network interface device 1610 communicatively coupled with bus 1608. Memory 1604 (also referred to as a computer-readable medium) is coupled to bus 1608 for storing data and information, e.g., instructions, to be executed by processing device 1602. Memory 1604 also may be used for storing temporary variables or other intermediate information during execution of instructions to be executed by processing device 1602. Memory 1604 may also comprise a read only memory (ROM) or other static storage device coupled to bus 1608 for storing static information and instructions for processing device 1602. Memory may comprise static and/or dynamic devices for storage, e.g., optical, magnetic, and/or electronic media and/or a combination thereof.

Optional I/O device 1606 may comprise an input device, an output device, and/or a combined input/output device for enabling interaction with controller 1502. For example, I/O device 1606 may comprise a user input device such as a keyboard, keypad, mouse, trackball, microphone, scanner, or other input mechanism, and/or an output device such as a display, speakers, or other output mechanism. Additionally, I/O device 1606 may comprise an input and/or an output connection for interacting with one or more sensors, e.g., a light sensor, a temperature sensor, a motion sensor, etc.

Network I/F device 1610 comprises a mechanism for connecting to a network. In at least some embodiments, network I/F device 1610 may comprise a wired and/or wireless connection mechanism. In at least some embodiments, processing device 1602 may communicate with another processing device, e.g., a computer system, via network interface device 1610. In at least some embodiments, controller embodiment 1600 may communicate with another controller embodiment via network interface device 1610, i.e. a first LED bulb according to LED bulb embodiment 1500 may communicate via a network connection with a second LED bulb according to LED bulb embodiment 1500. In this manner, two or more LED bulbs according to the above embodiment may communicate to transfer data and/or control commands between the LED bulbs.

Network I/F device 1610 comprises a serial and/or a parallel communication mechanism. Non-limiting, exemplary embodiments of network I/F device 1610 include at least a digital addressable lighting interface (DALI), an RS-232 interface, a Universal Serial Bus (USB) interface, an Ethernet interface, a WiFi interface, a cellular interface, etc.

Figure 17:
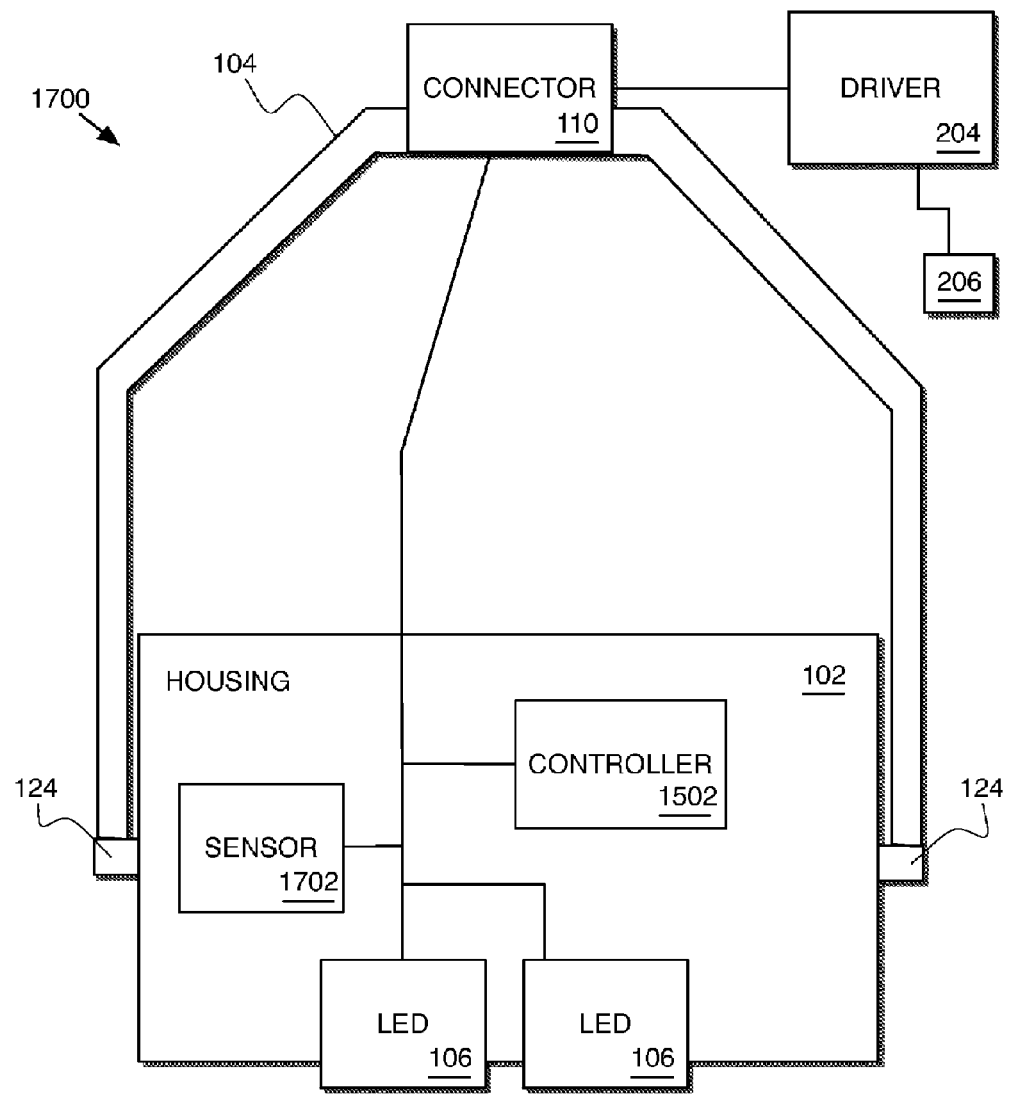
FIG. 17 is a high-level functional block diagram of an LED bulb according to another embodiment comprising a controller and a sensor.

FIG. 17 depicts an LED bulb 1700 according to an embodiment similar to LED bulb 1500. LED bulb 1700 additionally comprises a sensor 1702 communicatively coupled with at least controller 1502. In at least some embodiments, LED bulb 1700 comprises more than one sensor. In at least some embodiments, sensor 1702 is a temperature sensor, light sensor, motion sensor, voltage sensor. In some embodiments, controller 1502 modifies operation of one or more of LED units 106 responsive to receipt of information and/or data from sensor 1702.

For example, controller 1502 may be configured to execute a temperature control plan in which output of LED units 106 is reduced to a lower level after the controller receives a temperature value exceeding a first predetermined temperature threshold value from temperature sensor 1702. If the detected temperature exceeds a second predetermined temperature threshold value, controller 1502 terminates operation of LED units 106 until the detected temperature value falls below one or both of the predetermined temperature threshold values.

In accordance with another scenario in which sensor 1702 is a motion sensor, controller 1502 may be configured to control operation of LED units 106 based on whether motion is detected by motion sensor 1702. If no motion is detected after a predetermined period of time, controller 1502 terminates or operates at a reduced output one or both of LED units 106.

In accordance with another scenario in which sensor 1702 is a voltage sensor, controller 1502 may be configured to control operation of LED units 106 based on a detected voltage level exceeding or failing to meet (e.g., as in a brownout condition) a predetermined voltage level.

In at least some embodiments, sensor 1702 is electrically coupled with controller 1502 and/or connector 110. In at least some other embodiments, sensor 1702 is electrically isolated from controller 1502 and communicatively coupled with the controller. In some embodiments, sensor 1702 is located external and/or disconnected from LED bulb 1700. In at least some embodiments, controller 1502 performs daylight harvesting by adjusting the output of LED units 106 responsive to light level detected via sensor 1702.

In at least some embodiments, memory 1604 (as a part of controller 1600 (FIG. 16)) may be used to store information and/or data related to the operation of LED bulb 1700, e.g., historic data related to voltage levels, light activation times and durations, sensor data, and other parameters. An external device may remotely access the stored information and/or data from memory 1604 via a network I/F device 1610. Additionally, in at least some embodiments, network I/F device 1610 may be used to enable remote monitoring of LED bulb 1700. Via remote monitoring of LED bulb 1700, vital information such as statistics related to the operation of the LED bulb may be downloaded to another device. In at least some other embodiments, network I/F device 1610 may be used to remotely control LED bulb 1700.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A retrofit light emitting diode (LED) bulb comprising:
a screw connector for screwing the retrofit light emitting diode (LED) bulb into a receiving socket of an electric light fixture for supporting the retrofit light emitting diode (LED) bulb;
a bracket physically attached to the screw connector;
a housing coupled to the bracket, said housing comprising:
one or more LED units for generating light, wherein the one or more LED units is disposed on a front face of the housing arranged to generate light in a direction away from the front face of the housing, wherein said housing being coupled to the bracket permitting an angle such that when the retrofit light emitting diode (LED) bulb is attached to the receiving socket via the screw connector and when the coupling is at the angle then at least a portion of light generated by one or more of the LED units is directed approximately orthogonally from a linear direction at which the screw connector is screwed into the receiving socket;
a rear face of the housing comprising a heat sink thermally integrated to the housing, wherein the heat sink dissipates heat generated responsive to the one or more LED units generating light; and
one or more electrically powered cooling devices to remove heat from the vicinity of the one or more LED units, wherein air flow from the electrically powered cooling devices is approximately in parallel to a direction of the light generated by the one or more LED units and when the housing is rotatably coupled at the angle, the air flow from the electrically powered cooling device is approximately orthogonal to the linear direction, wherein the screw connector is a male screw base, which supports the bracket and housing when the retrofit light emitting diode (LED) bulb is screwed into the receiving socket.

2. The retrofit LED bulb of claim 1, wherein the housing is rotatably coupled to the bracket, and wherein the bracket is rigidly attached to the screw connector.

3. The retrofit LED bulb of claim 2, wherein a range of rotation permitted of the housing allows the LED units to focus light at different angles when the screw connector is screwed into the receiving socket.

4. The retrofit LED bulb of claim 1, wherein the housing comprises a heat sink that dissipates heat from the one or more LED units.

5. The retrofit LED bulb of claim 1, wherein said one or more LED units are a substantially planar surface of one side of the housing, wherein said one or more cooling devices are positioned at another side of the housing opposite to said one side comprising the one or more LED units.

6. The retrofit LED bulb of claim 1, wherein said housing comprises a plurality of vanes for dissipating heat from the one or more LED units.

7. The retrofit LED bulb of claim 1, wherein said one or more cooling devices comprise one or more fans positioned to rotate in a plane approximately orthogonal to the direction of the light generated by the one or more LED units.

8. The retrofit LED bulb of claim 1, wherein said electric light fixture permits a different type of bulb to be inserted into the receiving socket and to thereafter emit light, wherein the different type of bulb comprises a halogen, an incandescent or a fluorescent bulb, wherein the retrofit LED bulb directly replaces the different type of bulb.

9. The retrofit LED bulb of claim 8, wherein the screw connector, which directly powers the different type of bulb, does not directly power the one or more LED units.

10. The retrofit LED bulb of claim 1, wherein the screw connector conforms to one of the following standards; GU24, GU10, E11, E12, E17, E26, MR16, MR11.

11. The retrofit LED bulb of claim 1, wherein the screw connector is a power connector electronically coupled to the one or more LED units.

12. The retrofit LED bulb of claim 1, wherein the screw connector is the only securing means for coupling the retrofit LED bulb to the electric light fixture.

13. The retrofit LED bulb of claim 1, wherein light output from the one or more LED units substantially matches light output produced by a different type of bulb, which is able to be screwed into the receiving socket, wherein said retrofit LED bulb is a direct replacement for the different type of bulb.

14. A light emitting diode (LED) apparatus comprising:
a screw connector configured to be screwed into a receiving socket of an electric light fixture for supporting the retrofit light emitting diode (LED) bulb;
a bracket physically attached to the screw connector;
a housing rotatably coupled to the bracket, said housing comprising:
one or more LED units for generating light, wherein the one or more LED units is disposed on a front face of the housing arranged to generate light in a direction away from the front face of the housing, wherein said housing being rotatably coupled to the bracket permits an angle such that when the retrofit light emitting diode (LED) bulb is attached to the receiving socket via the screw connector and when the housing is coupled to the bracket at the angle then at least a portion of light generated by one or more of the LED units is directed approximately orthogonally from a linear direction at which the screw connector is screwed into the receiving socket;
a rear face of the housing comprising a heat sink thermally integrated to the housing, wherein the heat sink dissipates heat generated responsive to the one or more LED units generating light; and
one or more electrically powered fans to produce airflow that removes heat from a vicinity of the one or more LED units, wherein said one or more LED units are positioned in a substantially planar fashion on one side of the housing, wherein the one or more electronically powered fans are positioned on an opposite side of the housing from the side upon which the one or more LED units are positioned, and wherein the produced air flow from the electrically fans is approximately in parallel to a direction of the light generated by the one or more LED units and when the housing is rotatably coupled at the angle the air flow from the electrically powered fans is approximately orthogonal to the linear direction.

15. The LED apparatus of claim 14, wherein said electric light fixture permits a different type of bulb to be inserted into the receiving socket and to thereafter emit light, wherein the different type of bulb comprises a halogen, an incandescent, or a fluorescent bulb, wherein the retrofit LED bulb directly replaces the different type of bulb.

16. The LED apparatus of claim 14, wherein the screw connector conforms to one of the following standards; GU24, GU10, E11, E12, E17, E26, MR16, and MR11.

17. The LED apparatus of claim 14, wherein the screw connector is the only securing means for coupling the LED apparatus to the electric light fixture, wherein light output from the one or more LED units substantially matches light output produced by a different type of bulb, which is able to be screwed into the receiving socket, wherein said LED apparatus is a direct replacement for the different type of bulb.

18. A light emitting diode (LED) apparatus comprising:
   a screw connector for screwing a retrofit light emitting diode (LED) bulb into a receiving socket of an electric light fixture, wherein physical dimensions of the screw connector conform to one of the following standards; GU24, GU10, E11, E12, E17, E26, MR16, and MR11;
   a bracket physically attached to the screw connector;
   a housing rotatably coupled to the bracket, said housing comprising:
   one or more LED units for generating light, wherein the one or more LED units is disposed on a front face of the housing arranged to generate light in a direction away from the front face of the housing, wherein said housing being rotatably coupled to the bracket permits an angle such that when the retrofit light emitting diode (LED) bulb is attached to the receiving socket via the screw connector and when the housing is coupled to the bracket at the angle then at least a portion of light generated by one or more of the LED units is approximately orthogonal from a linear direction at which the screw connector is screwed into the receiving socket;
   a rear face of the housing comprising a heat sink thermally integrated to the housing, wherein the heat sink dissipates heat generated responsive to the one or more LED units generating light; and
   one or more electrically powered fans to produce airflow that removes heat from a vicinity of the one or more LED units, wherein said one or more LED units are positioned in a substantially planar fashion on one side of the housing, wherein the one or more electronically powered fans are positioned on an opposite side of the housing from the side upon which the one or more LED units are positioned, and wherein the produced air flow from the electrically fans is approximately in parallel to a direction of the light generated by the one or more LED units and when the housing is rotatably coupled at the angle the air flow from the electrically powered fans is approximately orthogonal to the linear direction.

19. The light emitting diode (LED) apparatus of claim 18, wherein the screw connector is the only securing means for coupling the LED apparatus to the electric light fixture.

20. The light emitting diode (LED) apparatus of claim 18, wherein light output from the one or more LED units substantially matches light output produced by a different type of bulb, which is able to be screwed into the receiving socket, wherein said LED apparatus is a direct replacement for the different type of bulb, wherein the different type of bulb comprises a halogen, an incandescent, or a fluorescent bulb.

* * * * *